US008172510B2

(12) United States Patent
Duong et al.

(10) Patent No.: US 8,172,510 B2
(45) Date of Patent: May 8, 2012

(54) RADIAL COMPRESSOR OF ASYMMETRIC CYCLIC SECTOR WITH COUPLED BLADES TUNED AT ANTI-NODES

(75) Inventors: Loc Q. Duong, San Diego, CA (US); Shiv C. Gupta, San Diego, CA (US); Xiaolan Hu, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 441 days.

(21) Appl. No.: 12/387,535

(22) Filed: May 4, 2009

(65) Prior Publication Data

US 2010/0278632 A1 Nov. 4, 2010

(51) Int. Cl.
*F03D 11/00* (2006.01)
*B64C 11/04* (2006.01)
*B63H 1/26* (2006.01)
*B63H 7/02* (2006.01)

(52) U.S. Cl. .................... 415/119; 416/241 R; 416/500; 416/228

(58) Field of Classification Search .............. 416/241 R, 416/203, 500, 185, 228; 415/119
See application file for complete search history.

(56) References Cited

U.S. PATENT DOCUMENTS

| | | | |
|---|---|---|---|
| 3,508,843 A | 4/1970 | Schmidt et al. | |
| 4,012,172 A | 3/1977 | Schwaar et al. | |
| 4,108,573 A | 8/1978 | Wagner | |
| 4,370,560 A | 1/1983 | Faulkner et al. | |
| 4,627,234 A | 12/1986 | Schuh | |
| 4,732,532 A | 3/1988 | Schwaller et al. | |
| 4,815,277 A | 3/1989 | Vershure, Jr. et al. | |
| 4,834,622 A | 5/1989 | Schuh | |
| 4,916,893 A | 4/1990 | Rodgers | |
| 5,140,819 A | 8/1992 | Napier et al. | |
| 5,491,308 A | 2/1996 | Napier et al. | |
| 5,681,145 A | 10/1997 | Neely et al. | |
| 5,993,161 A | 11/1999 | Shapiro | |
| 6,042,338 A | 3/2000 | Brafford et al. | |
| 6,379,112 B1 | 4/2002 | Montgomery | |
| 6,471,482 B2 | 10/2002 | Montgomery et al. | |
| 6,481,972 B2 | 11/2002 | Wang et al. | |
| 6,904,949 B2 | 6/2005 | Decker et al. | |
| 7,014,144 B2 | 3/2006 | Hein et al. | |
| 7,206,709 B2 | 4/2007 | Griffin et al. | |
| 7,252,481 B2 | 8/2007 | Stone | |
| 7,500,299 B2 | 3/2009 | Dupeux et al. | |
| 7,789,627 B2 | 9/2010 | Chiang et al. | |
| 2002/0174656 A1* | 11/2002 | Hein | 60/737 |
| 2006/0029493 A1 | 2/2006 | Schwaller et al. | |
| 2008/0145228 A1* | 6/2008 | Truckenmueller et al. | 416/203 |
| 2009/0191047 A1 | 7/2009 | Schlinker et al. | |
| 2010/0247310 A1* | 9/2010 | Kelly et al. | 416/1 |
| 2010/0278633 A1* | 11/2010 | Duong et al. | 415/119 |

* cited by examiner

*Primary Examiner* — Chuong A. Luu
(74) *Attorney, Agent, or Firm* — Kinney & Lange, P.A.

(57) ABSTRACT

A gas turbine engine includes a radial compressor having first and second blades. The first blade has a tuned leading edge that prevents either blade from exciting at a natural frequency at speeds within an expected operating speed range.

20 Claims, 6 Drawing Sheets

RADIAL COMPRESSOR OF ASYMMETRIC CYCLIC SECTOR WITH COUPLED BLADES TUNED AT ANTI-NODES

CROSS-REFERENCE TO RELATED APPLICATION

Reference is made to application Ser. No. 12/387,536 entitled "RADIAL COMPRESSOR WITH BLADES DECOUPLED AND TUNED AT ANTI-NODES", which is filed on even date and is assigned to the same assignee as this application.

Reference is also made to application Ser. No. 11/958,585 entitled "METHOD TO MAXIMIZE RESONANCE-FREE RUNNING RANGE FOR A TURBINE BLADE", filed on Dec. 18, 2007 by Loc Q. Duong, Ralph E. Gordon, and Oliver J. Lamicq and is assigned to the same assignee as this application.

BACKGROUND

The present invention relates to radial compressors, and in particular, to radial compressors with blades tuned according to natural frequency.

Gas turbine engines typically include several sections such as a compressor section, a combustor chamber, and a turbine section. In some gas turbine engines, the compressor section includes a radial compressor with a series of main blades and splitter blades connected by a disc. During operation of the gas turbine engine, the main blades and splitter blades can be subject to vibratory excitation at frequencies which coincide with integer multiples, referred to as harmonics, of the radial compressor's rotational frequency. As a result of the vibratory excitation, the main blades and/or the splitter blades can undergo vibratory deflections that create vibratory stress on the blades. If the vibratory excitation occurs in an expected operating speed range of the radial compressor, the vibratory stresses can create high cycle fatigue and cracks over time.

SUMMARY

According to the present invention, a gas turbine engine includes a radial compressor having first and second blades. The first blade has a tuned leading edge that prevents either blade from exciting at a natural frequency at speeds within an expected operating speed range.

Another embodiment includes a method for tuning a radial compressor. The method includes designing the radial compressor to have a first blade connected to a second blade having a substantially different shape from the first blade by a disc, wherein the first and second blades have first and second blade resonant modes that excite in an expected operating speed range of the radial compressor, tuning both the first and second blades by modifying mass quantity on the first blade at a primary anti-node of the first blade resonant mode, and fabricating the radial compressor as tuned.

DETAILED DESCRIPTION

Figure 1:
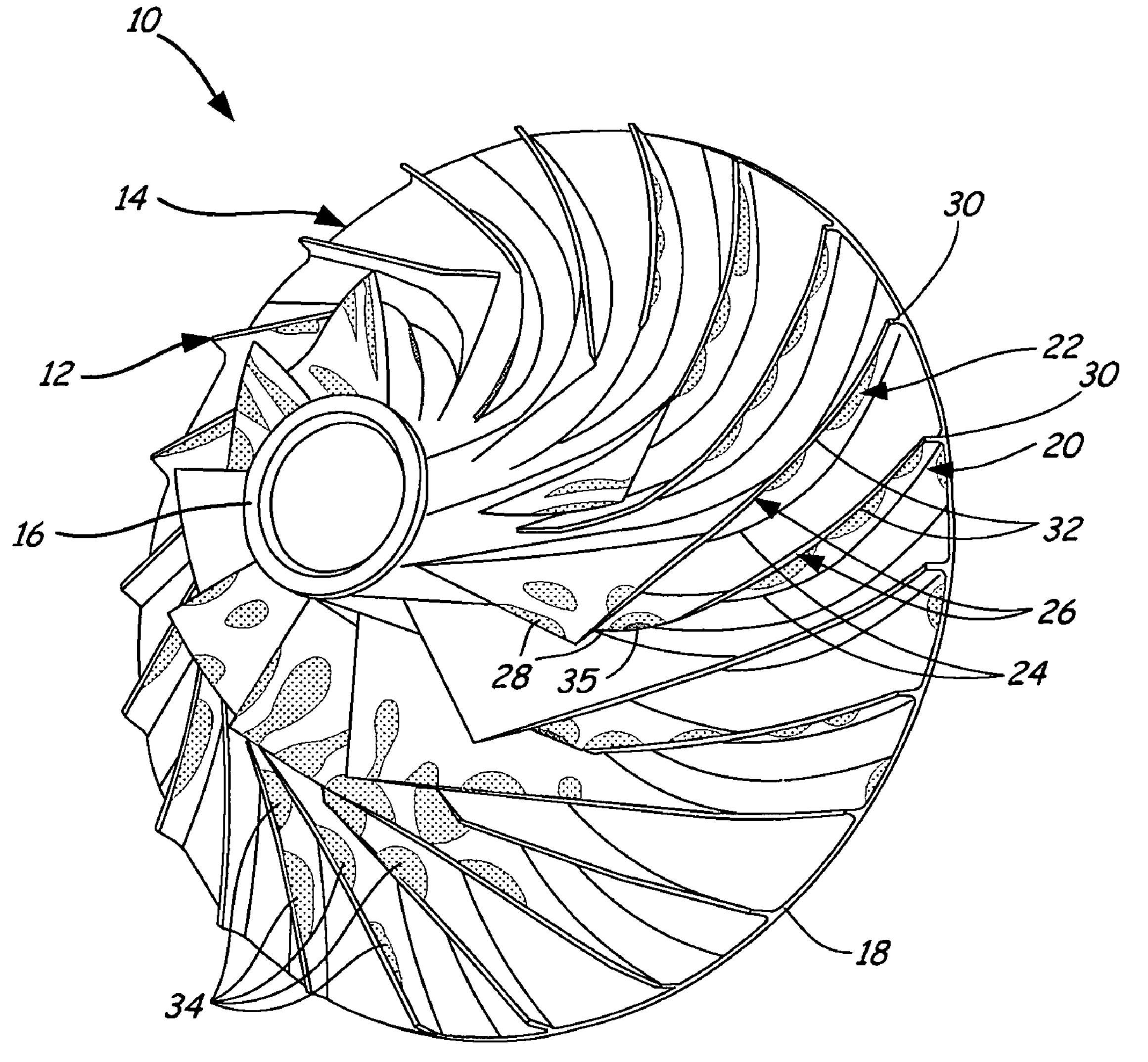
FIG. 1 is a perspective view of a radial compressor.

FIG. 1 is a perspective view of radial compressor 10 (also called an impeller or a bladed disc). Radial compressor 10 includes a plurality of blades 12 connected to disc 14 (also called a body). Disc 14 is curved and substantially frustoconical, extending from hub 16 at its inner diameter to rim 18 at its outer diameter. Blades 12 includes a series of splitter blades (e.g. splitter blade 20) positioned alternately with a series of main blades (e.g. main blade 22). Splitter blade 20 has a different shape, including a shorter chord length, than that of main blade 22. Splitter blade 20 and main blade 22 each have fixed edge 24 attached to disc 14 and free edge 26 unattached. Free edge 26 includes leading edge 28, trailing edge 30, and side edge 32 there-between.

Hub 16 can be attached to a compressor shaft of a gas turbine engine (not shown). In operation, air from a turbine inlet (not shown) can pass over leading edge 28, is compressed by blades 12 as radial compressor 10 rotates, and passes over trailing edge 30 on its way to a combustion chamber (not shown). Because operation of gas turbine engines is well known in the art, it will not be described in detail herein. However, during engine operation, various aero-excitation source frequencies can be created as air passes over components of the gas turbine engine, such as inducer or exducer vanes. Different source frequencies can be created at different operating speeds. These source frequencies are transmitted to the air, causing unsteady fluid pressure, and can then be transmitted to radial compressor 10. Radial compressor 10 can have one or more natural frequencies (also called resonance frequencies) in which one or more blades 12 and/or disc 14 will vibrate. If a natural frequency coincides with an aero-excitation source frequency, an interference can occur, causing undesired harmonic vibration. A variety of possible blade anti-nodes 34 are illustrated on free edges 26 of blades 12. Primary anti-node 35 is that with the greatest deflection of all blade anti-nodes 34 on a particular blade 12. If a particular blade 12 has two anti-nodes 34 with almost the same deflection, both can be referred to as primary anti-nodes 35, and any other anti-nodes 34 can be referred to as secondary anti-nodes 34.

Figure 2A:
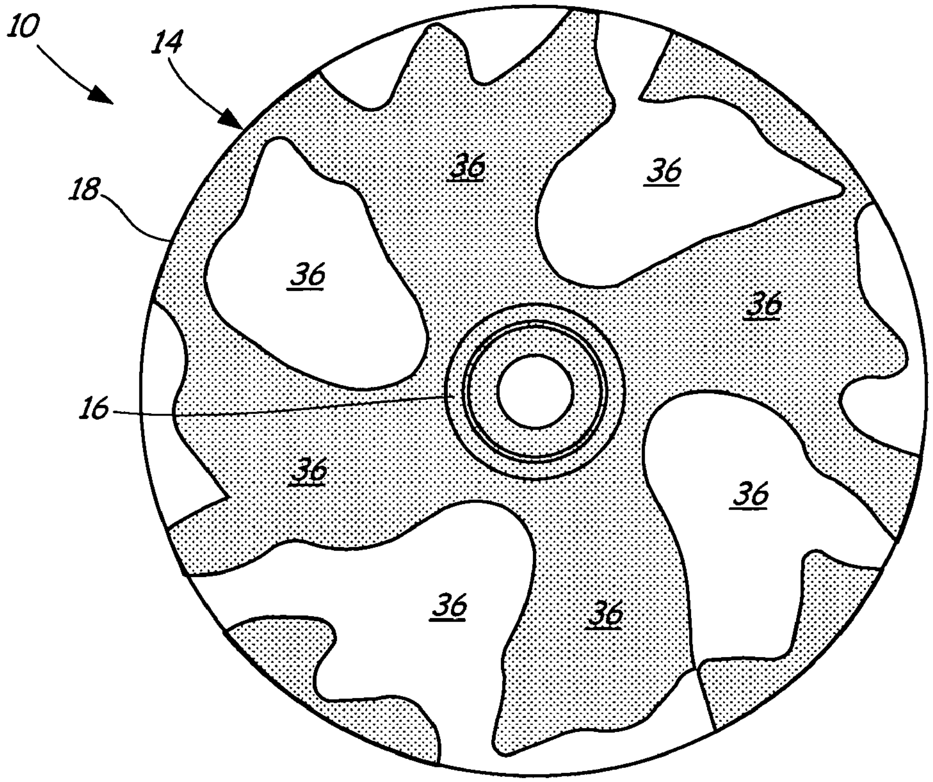
FIG. 2A is rear view of the radial compressor of FIG. 1, showing deflection of a resonant mode shape.

FIG. 2A is rear view of radial compressor 10, showing deflection of a resonant mode shape of disc 14. In the illustrated resonant mode shape, eight disc anti-nodes 36 are present. Disc anti-nodes 36 are points of greatest deflection of disc 14 in this resonant mode shape.

Figure 2B:
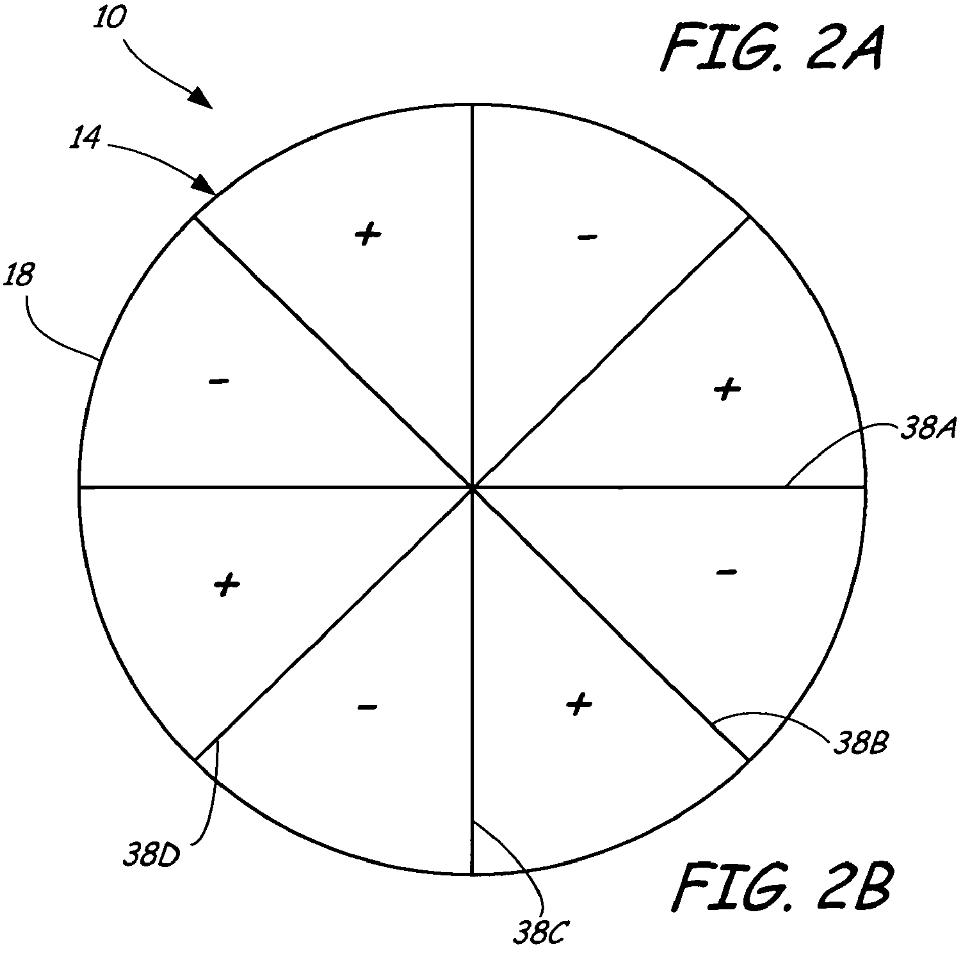
FIG. 2B is a simplified schematic view of the resonant mode shape of FIG. 2A.

FIG. 2B is a simplified schematic view of the mode shape of FIG. 2A. Nodal diameters 38A-38D divide disc anti-nodes 36. While disc anti-nodes 36 (shown in FIG. 2A) are points of greatest deflection, nodal diameters 38A-38D are lines of approximately zero deflection during harmonic vibration. The "+" and "−" symbols illustrate direction of deflection for disc anti-nodes 36 at a given moment in time. Deflection caused by harmonic vibration of disc 14 is transmitted to, and combines with deflection of, blades 12 (shown in FIG. 1).

Figure 3:
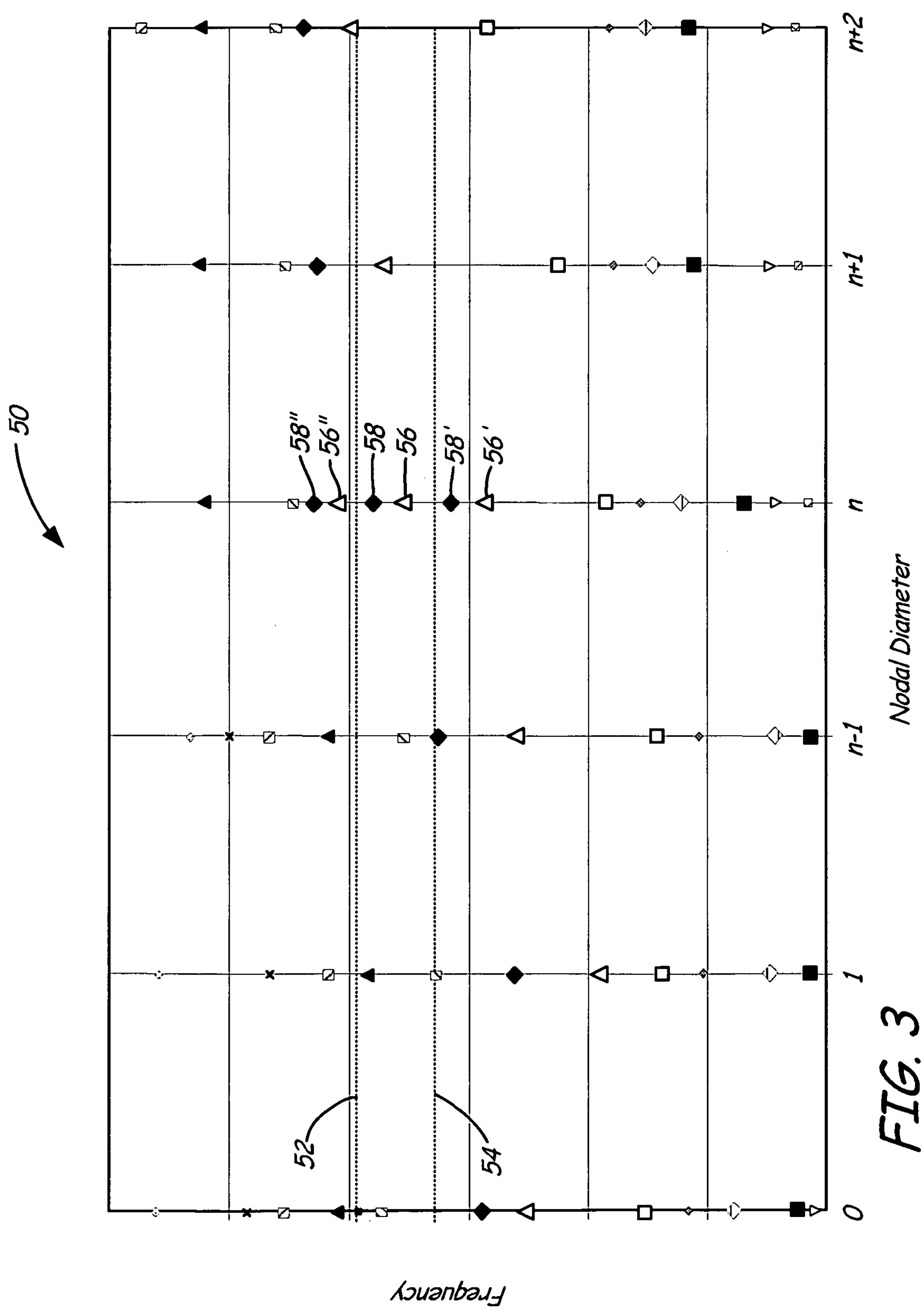
FIG. 3 is a nodal diameter interference map.

FIG. 3 illustrates nodal diameter (ND) interference map 50. ND interference map 50 plots potential interferences associated with various nodal diameters against vibration frequency. Along the horizontal axis of ND interference map 50, nodal diameters are identified as n−1, n, n+1, etc. Along the vertical axis, vibration frequency is plotted. Upper bound line 52 and lower bound line 54 are upper and lower bounds of an expected operating speed range of a gas turbine engine. Because gas turbine engines tend to operate within their expected operating speed ranges, vibration interferences that occur within the expected operating speed range can be of particular importance.

For example, radial compressor 10 has a variety of natural frequencies associated with nodal diameter n that are potentially excitable at different operating speeds. However, radial compressor 10 only has two natural frequencies 56 and 58 associated with nodal diameter n that occur in the expected operating speed range. As illustrated, natural frequency 56 corresponds to splitter blade 20 and natural frequency 58 corresponds to main blade 22. It can be desirable to tune radial compressor 10 such that natural frequencies 56 and 58 excite outside of the expected operating speed range. For example, radial compressor 10 could be tuned such that natural frequencies 56' and 58' occur below lower bound line 54. In that case, natural frequencies 56' and 58' will not be excited in the expected operating speed range. Natural frequencies 56' and 58' could, however, be excited for a period of time as the gas turbine engine speeds up during initial startup and shutdown. Alternatively, radial compressor 10 could be tuned such that natural frequencies 56" and 58" occur above upper bound line 52. In that case, natural frequencies 56" and 58" will not be excited in the expected operating speed range nor during initial startup and shutdown.

Figure 4:
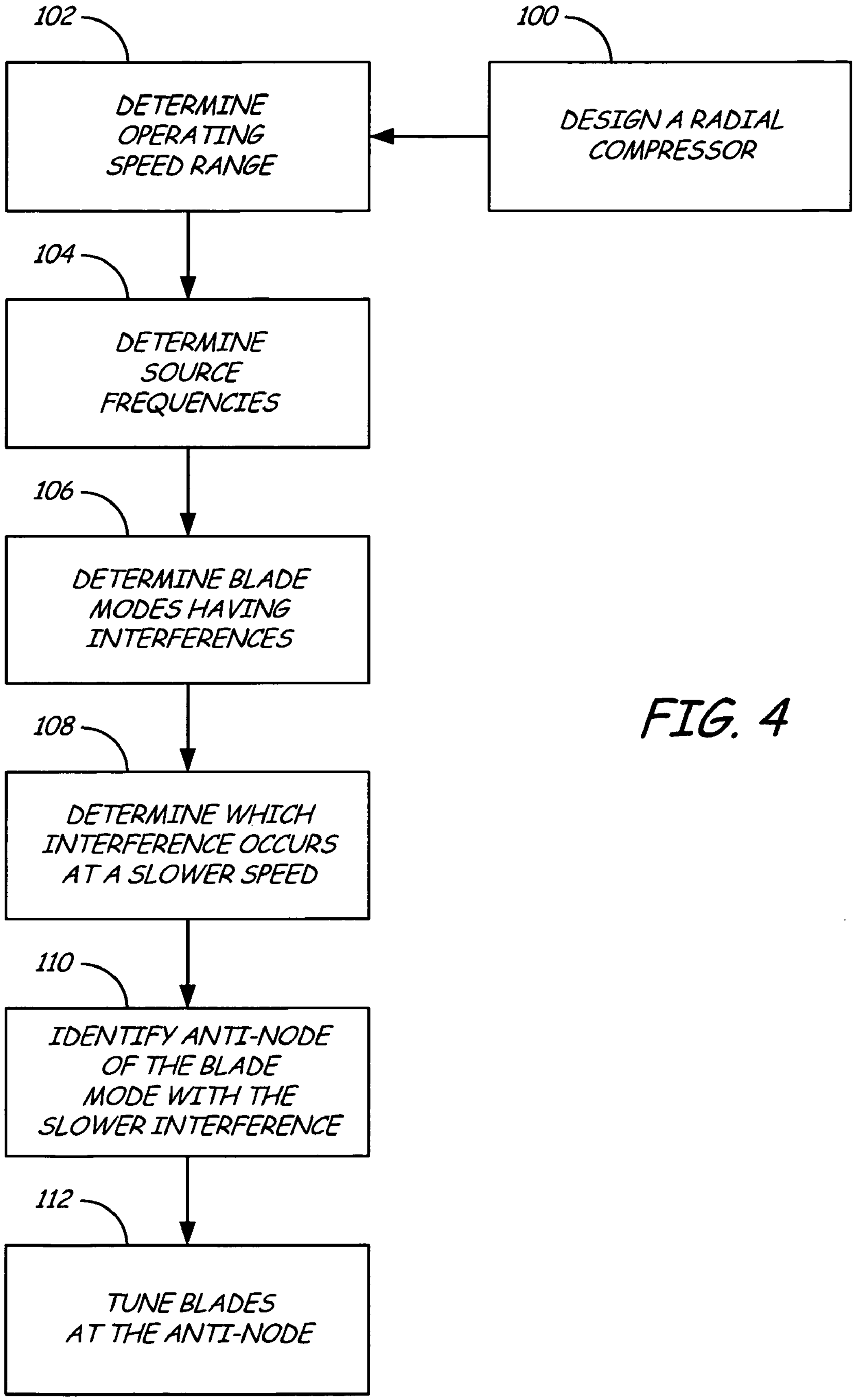
FIG. 4 is a flow chart of a method of tuning the radial compressor of FIG. 1.

FIG. 4 is a flow chart of a method of tuning radial compressor 10. The method begins by designing a radial compressor, such as radial compressor 10 of FIG. 1, that requires tuning (step 100). In step 100, radial compressor 10 can be physically fabricated, or an electronic model of radial compressor 10 can be created. Next, an expected operating speed range for radial compressor 10 is determined (step 102). For example, radial compressor 10 could be expected to operate in a particular gas turbine engine in a speed range of between about 15,300 revolutions per minute (RPM) and about 15,900 RPM. Then aero-excitation source frequencies in the expected operating speed range are determined (step 104). The aero-excitation source frequencies coincide with integer multiples of the engine operating speed (the rotational frequency of radial compressor 10). Next, blade resonant mode shapes which have interferences are determined (step 106). An interference occurs when one of blades 12 has a resonant mode with a corresponding natural frequency that coincides with one of the aero-excitation source frequencies at a particular nodal diameter n. In some circumstances (such as that illustrated above with respect to FIG. 3), splitter blade 20 and main blade 22 will each have a different blade resonant mode with a corresponding natural frequency that coincides with one of the aero-excitation source frequencies within the expected operating speed range. After it is determined that splitter blade 20 and main blade 22 each have a blade resonant mode with an interfering natural frequency, the blade resonant mode interfering at a slower speed is determined (step 108). For example, splitter blade 20 could have a blade resonant mode that resonates at a slower speed than that of main blade 22.

After it is determined that splitter blade 20 has the slower blade resonant mode, location of one or more blade anti-nodes 34 of the blade resonant mode for splitter blade 20 is identified (step 110). Blade anti-nodes 34 typically occur along free edge 26, and in particular, along leading edge 28. If there is more than one blade anti-node 34 along free edge 26, one or more primary anti-nodes 35 have greater deflection than all other blade anti-nodes 34 of the blade resonant mode shape in question. In radial compressors such as radial compressor 10, one primary anti-node 35 is typically positioned along leading edge 28. Location of blade anti-nodes 34 can be determined through eigenvalue solutions, in a manner known in the art. Main blade 22 also has one or more blade anti-nodes 34, however, the present method does not involve direct tuning of these anti-nodes 34.

Next splitter blade 20 is tuned at blade anti-nodes 34 (step 112). Tuning is performed by modifying mass localized at one or more blade anti-nodes 34 on splitter blade 20. Increasing mass at blade anti-nodes 34 decreases natural frequency, and decreasing mass at blade anti-nodes 34 increases natural frequency. When mass at blade anti-nodes 34 on splitter blade 20 is reduced, its natural frequency can be increased from natural frequency 56 (shown on FIG. 3) to natural frequency 56", outside of the expected operating speed range. Because disc 14 is relatively thin, vibrations in splitter blade 20 and main blade 22 transmit to and excite each other. This coupling of the blades causes modifications to natural frequency of splitter blade 20 to also affect natural frequency of main blade 22. Thus, natural frequency of main blade 22 will increase from natural frequency 58 (shown on FIG. 3) to natural frequency 58", even though no mass modification occurs on main blade 22. This phenomenon occurs because of what is known as the veering property of eigenvalues (also called the non-coalescent property of eigenvalues or eigenvalue curve veering). Essentially, splitter blade 20 and main blade 22 cannot share the same natural frequency at the same nodal diameter so long as they are vibrationally coupled and have substantially different shapes from each other. So, when splitter blade 20 is modified such that its natural frequency approaches the natural frequency of main blade 22 at a particular nodal diameter, the natural frequency of main blade 22 will be pushed or "veer" away. Thus, natural frequencies of splitter blade 20 and main blade 22 can both be pushed out of the expected engine operating speed range by simply decreasing mass at blade anti-node 34 on splitter blade 20.

Step 112 can be repeated to tune all of splitter blades 20. It can be relatively effective and efficient to modify mass only at primary anti-node 35 on leading edge 28 of each of splitter blades 20. If further tuning is desired, mass quantity can be modified at additional blade anti-nodes 34 of splitter blades 20. After tuning is complete, radial compressor 10 can have no natural frequencies that excite in the expected operating speed range. Leading edge 28 on splutter blade 20 is tuned to prevent either blade from exciting at a natural frequency at speeds within an expected operating speed range.

Some or all of steps 100-112 can be performed physically, electronically, or both. If steps 100-112 are performed electronically, radial compressor 10 can then be fabricated as electronically tuned. Radial compressor 10 can be fabricated using techniques such as forging and machining.

Figure 5:
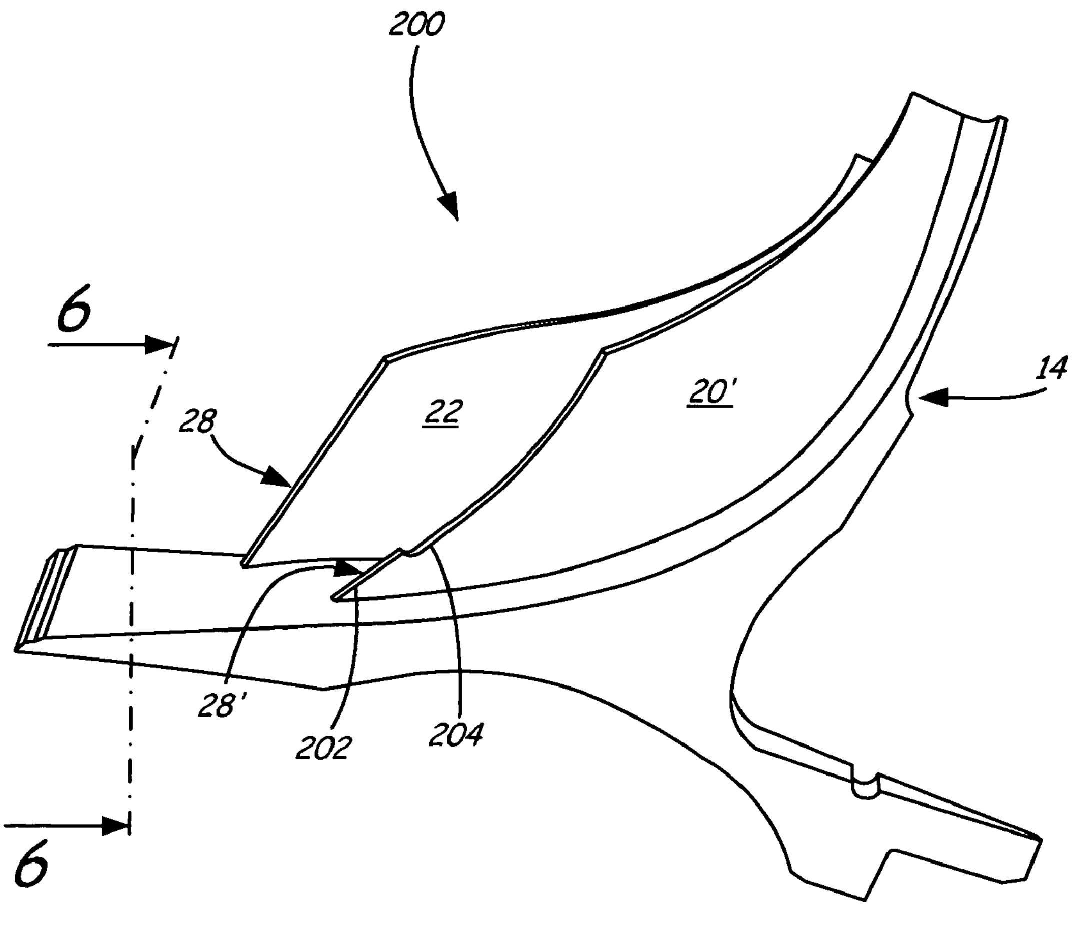
FIG. 5 is an enlarged view of a cyclic sector of the radial compressor of FIG. 1.

FIG. 5 is an enlarged sectional view of cyclic sector 200, which is one of a plurality of duplicate sectors of radial compressor 10 and has been modified as described with respect to the method of FIG. 4. Cyclic sector 200 includes splitter blade 20' and main blade 22 connected by disc 14. Splitter blade 20' is similar to splitter blade 20 of FIG. 1 except that leading edge 28' of splitter blade 20' has normal portion 202 and tuned portion 204. Tuned portion 204 is positioned at a location that coincided with primary anti-node 35 prior to tuning, and prevents formation of such anti-nodes on both splitter blade 20' and main blade 22. Tuned portion 204 can be described as a notch, where mass is trimmed to increase natural frequency of a resonant blade mode of splitter blade 20'. In the illustrated embodiment, tuned portion 204 is positioned radially further from disc 14 than normal portion 202. Leading edge 28 of main blade 22 is not trimmed.

Figure 6:
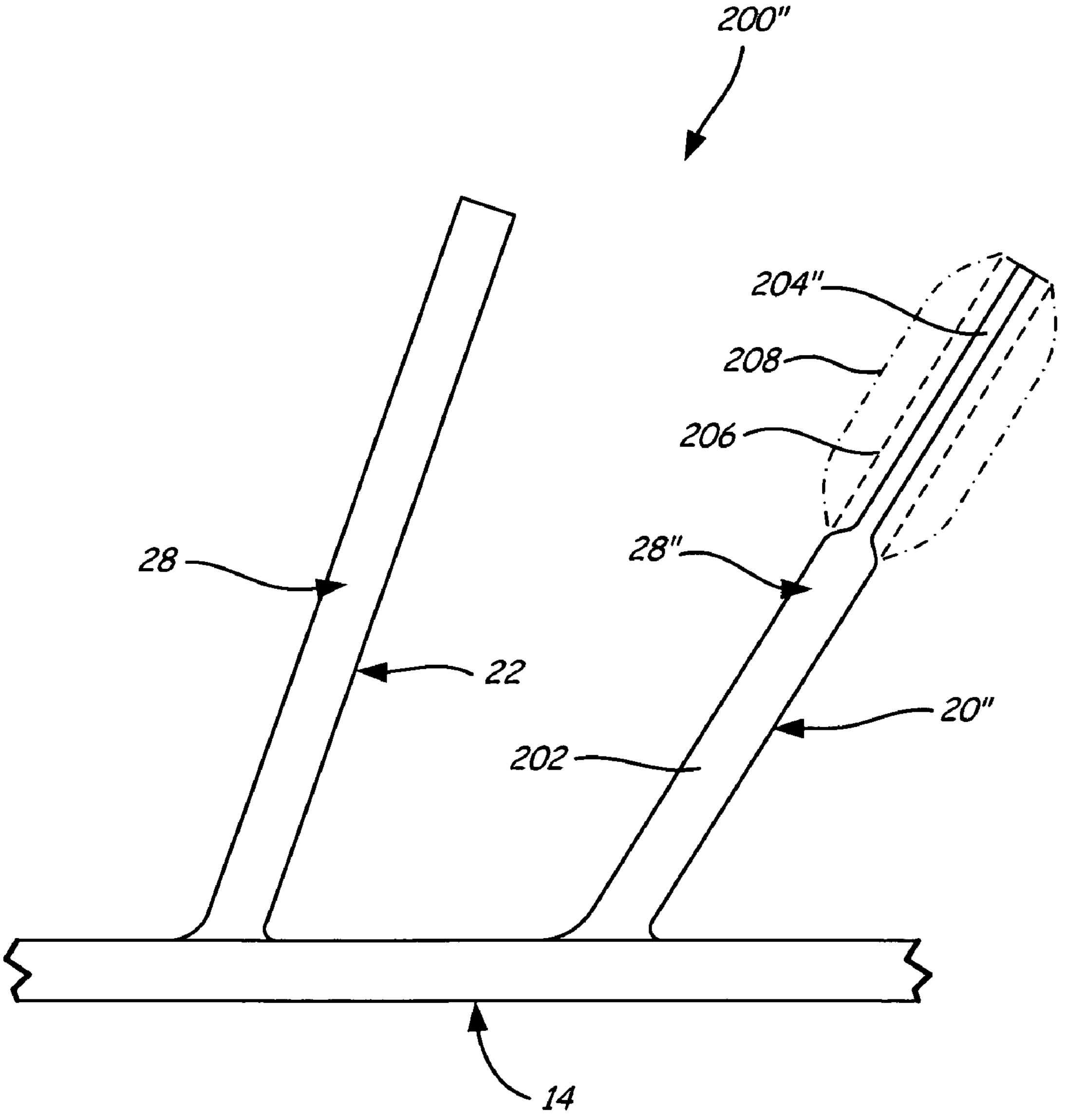
FIG. 6 is a schematic sectional view of an alternative embodiment of the cyclic sector of the radial compressor taken along line 6-6 of FIG. 5.

FIG. 6 is a schematic sectional view of an alternative embodiment of cyclic sector 200" of radial compressor 10 taken along line 6-6 of FIG. 5. Cyclic sector 200" of FIG. 6 is similar to cyclic sector 200 of FIG. 5 except for mass modification at tuned portion 204". In the illustrated embodiment, mass removal can be achieved by smoothly and continuously reducing thickness of splitter blade 20" at tuned portion 204". Thickness of tuned portion 204" is thinner and sufficiently different from thickness of normal portion 202 to tune natural frequencies of both of splitter blade 20" and main blade 22 outside of the expected operating speed range. Non-tuned thickness 206 (a thickness of tuned portions 204" prior to tuning) is substantially equal to thickness of normal portion 202. The location of tuned portion 204" would coincide with an anti-node if tuned portion 204 had thickness substantially equal to that of normal portion 202.

Splitter blade 20" can also be modified by adding mass at tuned portion 204". For example, mass addition can be achieved by smoothly and continuously increasing thickness of splitter blade 20" at tuned portion 204" from non-tuned thickness 206 to increased mass tuned thickness 208. Smooth mass modification allows for reduced aerodynamic impact and flow separation. Such a mass increase on splitter blade 20' would reduce its natural frequency. This example corresponds to ND interference map 50 on FIG. 3 where main blade 22 has natural frequency 56 and splitter blade 20" has natural frequency 58 prior to tuning. After tuning, splitter blade 20" has natural frequency 58', which causes main blade to then have natural frequency 56'. Both natural frequencies 56' and 58' are then below the expected operating speed range when mass is added at tuned portion 204".

After splitter blade 20" is tuned, its contour profile geometry can be optimized to reduce stress concentration while maintaining a desirable aero-constraint on an incident angle of leading edge 28" within about 2 degrees. All of radial compressor 10 can be tuned similarly to cyclic sector 200" such that splitter blade 20" is one of a plurality of substantially similar tuned splitter blades. In the illustrated embodiment, thickness of leading edge 28 of main blade 22 is neither increased nor decreased. Main blade 22 need not be modified because modification to splitter blade 20" tunes both splitter blade 20 and main blade 22. In an alternative embodiment, thickness of leading edge 28 of main blade 22 can be modified, while splitter blade 20" remains unmodified.

It will be recognized that the present invention provides numerous benefits and advantages. For example, tuning radial compressor 10 moves natural frequencies out of an expected operating speed range and, therefore, reduces vibratory stresses and cracks in radial compressor 10. By modifying mass at primary anti-node 35, tuning can be more efficient and more effective than by modifying mass at other locations on blades 12, disc 14, or elsewhere in the gas turbine engine. Additionally, by modifying mass at leading edge 28 instead of at trailing edge 30, problems associated with mass modification at trailing edge 30 can be reduced (such as weakening the blades due to elastic deformation if trailing edge 30 is made thinner or increasing steady state stress if trailing edge 30 is made thicker). This invention can be particularly useful in applications where it is undesirable to modify mass of one of splitter blade 20 or main blade 22, since mass can be modified on the other blade to tune natural frequency of both blades.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, blades 12 and disc 14 need not be configured as specifically illustrated so long as they are part of a radial compressor that benefits from tuning as described.

The invention claimed is:

1. A radial compressor for use in a gas turbine engine operating in an expected operating speed range, the radial compressor comprising:

a first radial compressor blade having a first leading edge with a first normal portion and a first tuned portion, wherein the first tuned portion has a thickness different than that of the first normal portion;

a second radial compressor blade having a substantially different shape from the first radial compressor blade; and a substantially frusto-conical disc connecting the first radial compressor blade to the second radial compressor blade and having a thickness sufficiently thin to couple vibration in the first radial compressor blade with vibration in the second radial compressor blade when operating in the expected operating speed range.

2. The radial compressor of claim 1, wherein thickness of the first tuned portion is sufficiently different from thickness of the first normal portion to tune natural frequencies of the first and second radial compressor blades outside of the expected operating speed range.

3. The radial compressor of claim 1, wherein the first tuned portion causes the first and second radial compressor blades to have first and second natural frequencies that excite at operating speeds greater than the expected operating speed range.

4. The radial compressor of claim 1, wherein the first and second radial compressor blades have no natural frequencies that excite in the expected operating speed range.

5. The radial compressor of claim 1, wherein the first radial compressor blade is one of a plurality of substantially similar splitter blades and the second radial compressor blade is one of a plurality of substantially similar main blades, wherein the splitter blades have a shorter chord length than that of the main blades, and wherein the splitter blades are positioned alternately with the main blades around the disc.

6. The radial compressor of claim 1, wherein the first tuned portion is positioned on the first leading edge to prevent formation of a first primary vibration anti-node at the first tuned portion and also to prevent formation of a second primary vibration anti-node on the second radial compressor blade at speeds within the expected operating speed range.

7. The radial compressor of claim 1, wherein the first tuned portion is positioned further from the disc than the first normal portion.

8. The radial compressor of claim 1, wherein the first tuned portion is thinner than the first normal portion.

9. The radial compressor of claim 1, wherein the radial compressor is an impeller having a curved disc for a gas turbine engine.

10. A gas turbine engine comprising:

a radial compressor having first and second radial compressor blades, wherein the first radial compressor blade has a tuned leading edge that prevents either radial compressor blade from exciting at a natural frequency at speeds within an expected operating speed range.

11. The radial compressor of claim 10, wherein the second radial compressor blade has a substantially different shape from the first radial compressor blade and wherein the radial compressor includes a substantially frusto-conical disc connecting the first radial compressor blade to the second radial compressor blade and having a thickness sufficient to couple vibration in the first radial compressor blade with vibration in the second radial compressor blade when operating in the expected operating speed range.

12. A method for tuning a radial compressor, the method comprising:

designing the radial compressor to have a first blade connected to a second blade having a substantially different shape from the first blade by a disc, wherein the first and second blades have first and second blade resonant modes that excite in an expected operating speed range of the radial compressor;

tuning both the first and second blades by modifying mass quantity on the first blade at a primary anti-node of the first blade resonant mode; and fabricating the radial compressor as tuned.

13. The method of claim 12, wherein the step of designing the radial compressor includes creating an electronic model of the radial compressor and the step of tuning occurs electronically with respect to the electronic model.

14. The method of claim 12, and further comprising:

determining whether the first resonant mode or the second resonant mode occurs at a slower operating speed prior to tuning.

15. The method of claim 12, wherein modifying mass at the primary anti-node on the first blade pushes first and second natural frequencies excited in the first and second blade resonant modes, respectively, to operating speeds outside of the expected operating speed range.

16. The method of claim 12, wherein a natural frequency of the second blade that is excited in the second blade resonant mode is pushed to operating speeds outside of the expected operating speed range due to a non-coalescent property of eigenvalues when mass quantity is modified at the primary anti-node on the first blade.

17. The method of claim 12, wherein the first blade resonant mode excites at a slower operating speed than the second blade resonant mode and wherein the first and second blades are tuned by decreasing mass at the primary anti-node on the first blade.

18. The method of claim 12, wherein the primary anti-node is positioned at a first leading edge of the first blade.

19. The method of claim 12, and further comprising:

identifying the primary anti-node on the first blade through eigenvalue solutions.

20. The method of claim 12, wherein the primary anti-node on the first blade has a greater deflection than all other anti-nodes of the first blade resonant mode.

* * * * *